W. G. GRANT.
REINFORCING WIRE BACK FOR BRAKE SHOES.
APPLICATION FILED AUG. 28, 1911.

1,033,242.

Patented July 23, 1912.

2 SHEETS—SHEET 1.

WITNESSES
R. N. Flint
A. V. Walsh

INVENTOR
William G. Grant
BY George Cook
ATTORNEY

W. G. GRANT.
REINFORCING WIRE BACK FOR BRAKE SHOES.
APPLICATION FILED AUG. 28, 1911.

1,033,242.

Patented July 23, 1912.
2 SHEETS—SHEET 2.

WITNESSES
INVENTOR
William G. Grant
BY George Cook
ATTORNEY

UNITED STATES PATENT OFFICE.

WILLIAM G. GRANT, OF MAYWOOD, ILLINOIS, ASSIGNOR TO EDWARD H. FALLOWS, OF NEW YORK, N. Y.

REINFORCING WIRE BACK FOR BRAKE-SHOES.

1,033,242.   Specification of Letters Patent.   Patented July 23, 1912.

Application filed August 23, 1911. Serial No. 646,386.

*To all whom it may concern:*

Be it known that I, WILLIAM G. GRANT, a citizen of the United States, and a resident of Maywood, in the county of Cook and State of Illinois, have made and invented certain new and useful Improvements in Reinforcing Wire Backs for Brake-Shoes, of which the following is a specification.

My invention relates to an improvement in brake shoes, and more particularly to a strengthening or reinforcing back designed to be embedded or partially so, in the rear surface or back of a shoe to strengthen the same and hold the parts thereof together should the shoe become cracked or broken in use, and until it is entirely worn out. Strengthening or reinforcing backs of the type to which my invention relates are commonly formed from a piece of iron or steel rod or wire so bent and arranged as to extend over and strengthen the entire back of the shoe, and also bent to provide a lug whereby to secure the shoe to a brake head.

The object of my invention is to simplify the construction of back of the type above referred to, and to provide a reinforcing back which may be readily and easily manufactured from a single piece of wire, by simple bending operations.

With the above and other objects in view, the invention consists in the improved reinforcing back for brake shoes illustrated in the accompanying drawing, described in the following specification, and particularly claimed in the clauses of the concluding claim, and in such variations and modifications thereof as will be obvious to those skilled in the art to which my invention relates.

Figure 1:
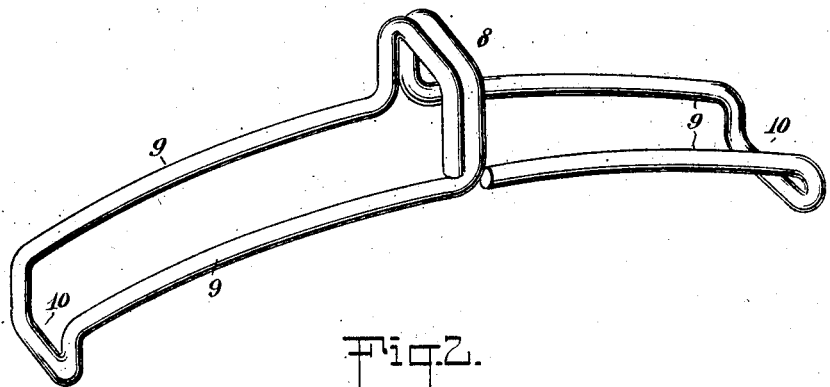
Figure 2:
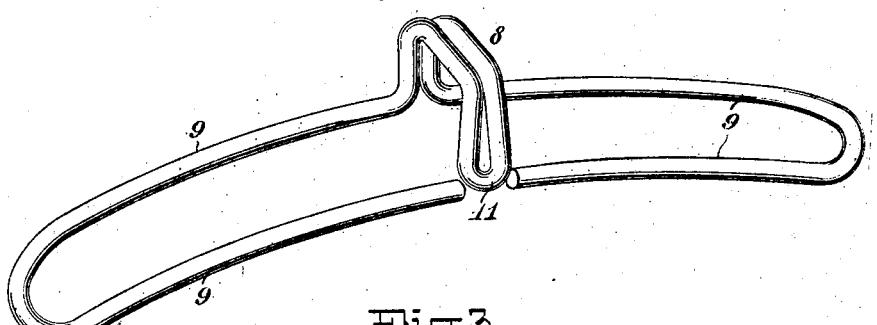
Figure 3:
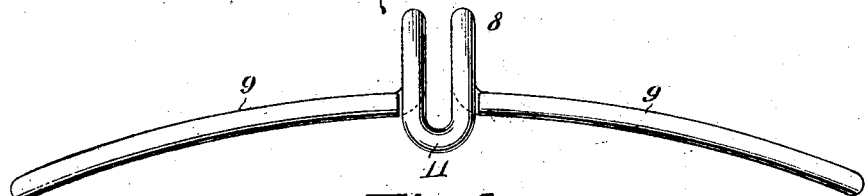
Figure 4:
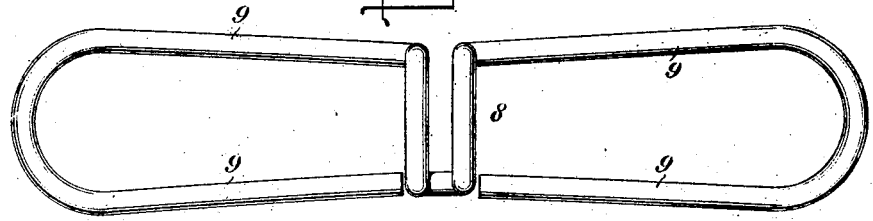
Figure 5:
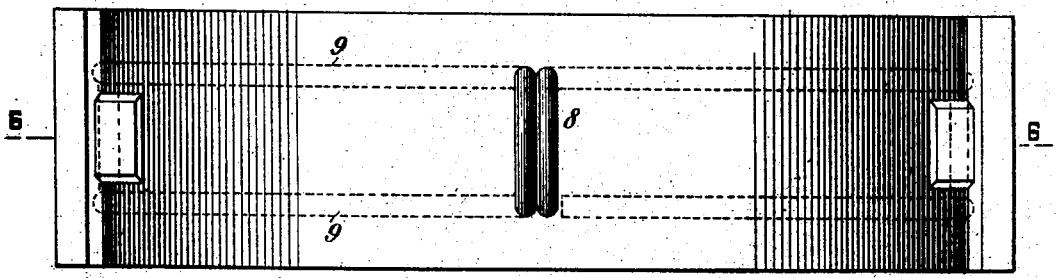
Figure 6:
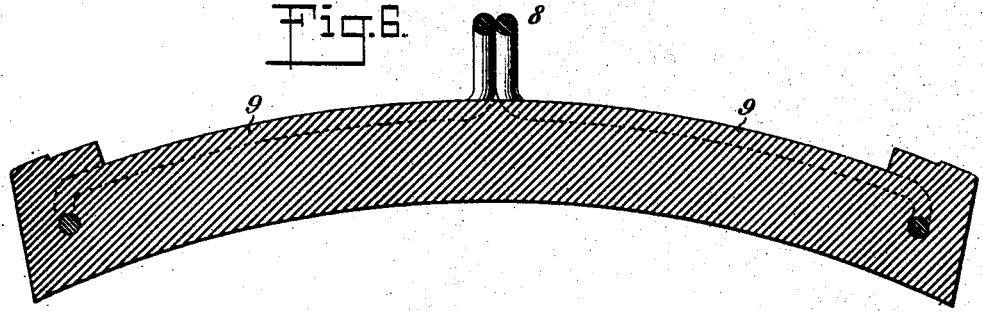
Figure 7:
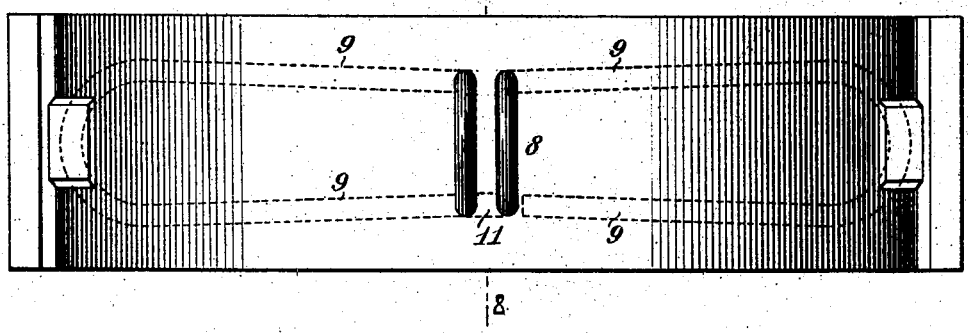
Figure 8:
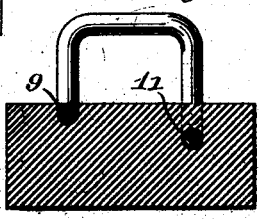

In the drawings accompanying and forming part of this application, Figure 1 is a view showing one form of my device in perspective; Fig. 2 is a similar view showing another form of my device; Fig. 3 is a view showing a third form of invention in side elevation; Fig. 4 is a view showing the same in plan; Fig. 5 is a view showing the form of my invention illustrated in Fig. 1 embedded in the back of a brake shoe; Fig. 6 is a view showing a section upon a longitudinal plane indicated by the line 6—6, Fig. 5; Fig. 7 is a view showing the form of my invention illustrated in Fig. 3 embedded in the back of a brake shoe, and Fig. 8 is a view showing a section upon a transverse plane indicated by the line 8—8, Fig. 7.

In the drawings I have illustrated a strengthening or reinforcing back for brake shoes formed from a single rod or piece of wire in accordance with my invention, the same being bent to provide a centrally located, upwardly projecting, lug 8 whereby the shoe may be secured to a brake head, which lug as will be understood, is formed in the middle portion of the rod or wire. The ends of the wire beyond the lug are bent to provide two end loops 9—9, which extend in opposite directions from said central loop so that one end loop lies upon each side of the central lug, 8, the extremities of the wire, from which the back is formed, occupying a position adjacent the middle portion of the back. The outer ends of the loops 9 are preferably bent downward at substantially right angles to the planes of the loops as shown at 10, in Fig. 1, in which case the ends of the loops extend farther into the body portion of the shoe, and are more firmly anchored therein, as shown in Fig. 6, than is the case when this feature is omitted; and, while such is shown in Fig. 1 only, it will be understood that the ends of the loops illustrated in Figs. 2, 3 and 4 may also be bent downward in the same manner.

My improved back is best made by first forming a central loop in the wire from which the back is formed, and afterward bending the ends of the wire to form the end loops 9. The central loop is, either before or after the end loops are formed, bent to provide the upwardly projecting lug 8, resulting in a lug having double wires. After the end loops 9—9 have been formed and the central loop bent to form the lug 8, the free end 11 of the lug lies, preferably, between the extremities of the wires of the end loops, as shown in Figs. 2 and 3, the end of the lug 8 preferably extending below the extremities of the wires of the end loops, as shown in Fig. 3, so as to become more firmly anchored in the body of the shoe as will be understood from Figs. 7 and 8. The improved back after being formed as described, is then placed within the mold in which the shoe is to be cast, and the molten metal poured around the same, the back becoming embedded and anchored in the rear surface of the cast metal body portion of the shoe as shown in Figs. 5 to 8.

Having thus described and explained my invention, I claim and desire to secure by Letters Patent:

1. A reinforcing back for brake shoes formed from a single piece of wire bent to provide a central upwardly projecting lug, the ends of which wire are bent to provide two end loops extending in opposite directions from said central lug, the extremities of said wire terminating adjacent the middle portion of the back and the outer ends of said end loops being bent downward at substantially right angles to the planes of said loops.

2. A reinforcing back for brake shoes formed from a single piece of wire bent and doubled upon itself to provide a central loop, which loop is bent to provide an upwardly projecting lug, the end portions of said wire being bent to provide two end loops and the extremities of which wire terminate at the middle portion of said back.

3. A reinforcing back for brake shoes formed from a single piece of wire bent and doubled upon itself to provide an upwardly projecting lug, the end portions of said wire being bent to provide two end loops and the extremities of which wire are in line with one another and terminate at the middle portion of said back and adjacent the free end of said lug.

4. A reinforcing back for brake shoes formed from a single piece of wire bent to provide a central loop, the ends of which wire are bent to provide two end loops extending in opposite directions from said central loop and the extremities of which wire terminate adjacent the middle of the back, said central loop being bent to provide an upwardly projecting lug the free end of which lies between the extremities of said wire.

5. A reinforcing back for brake shoes formed from a single piece of wire bent to provide a central loop, the ends of which wire are bent to provide two end loops extending in opposite directions from said central loop and the extremities of which wire terminate adjacent the middle of the back, said central loop being bent to provide an upwardly projecting lug the free end of which lies between and extends below the extremities of said wire.

6. A strengthening or reinforcing back for brake shoes formed from a single piece of wire bent to provide a central loop, the ends of which wire are bent to provide two end loops extending in opposite directions, and the extremities of which wire terminate adjacent the middle of the back, said central loop being bent to provide an upwardly projecting lug, and the outer ends of said end loops being bent downward at substantially right angles to the planes of said loops.

7. A reinforce for brake shoes made out of a single rod shaped to form a key lug at its center and bent transversely to extend across the ends of the shoe, the transversely extending portions aforesaid occupying a position below the plane of said reinforce.

8. A reinforce for brake shoes made out of a single rod and comprising a centrally disposed key lug and oppositely formed loops, each of said loops being connected at one end to an end of the key lug and having its other end free and directed inwardly toward and adjacent to the key lug, the outer ends of said loops being bent downward at substantially right angles to the planes of said loops.

Signed at Maywood, in the county of Cook, and State of Illinois, this 17th day of August, A. D. 1911.

WILLIAM G. GRANT.

Witnesses:
 FRED EGGLESTON,
 FRED W. SEYMOUR.